Jan. 10, 1967  C. W. STEWART  3,296,859
METER BAR

Filed May 20, 1964  2 Sheets-Sheet 2

INVENTOR.
CHARLES W. STEWART
BY
Jerome R. Cox
ATTORNEY

United States Patent Office 3,296,859
Patented Jan. 10, 1967

3,296,859
METER BAR
Charles W. Stewart, 952 Sheridan Drive,
Lancaster, Ohio 43130
Filed May 20, 1964, Ser. No. 368,969
9 Claims. (Cl. 73—201)

The invention disclosed and claimed in this application relates to meter bars. More specifically the invention is illustrated by an embodiment thereof consisting of a meter bar with a built in by-pass.

There are a great many domestic gas meters in service in the United States today, some estimates indicating that there are 32,000,000 such meters in service, and indicating that approximately a million new customers are added each year requiring the installation of that many additional gas meters. Most states require meter changes after a service life of from 6 to 10 years. Computed on the above stated number of gas meters in service, and upon an estimated additional million gas meter changes on account of defects in meters, on account of requests, on account of obsolescene and on account of changes of meter locations, I estimate that the total annual meter changes will amount to more than five million each year. The changes of meter locations are increasing rapidly on account of a trend for moving meters from under houses and in basements to the outside of the houses in order to give outside access to the meters for safety and for convenience and to circumvent costly call backs in meter reading. It is obvious that when transferring a meter from inside of the house to the outside, a subtantial rigid meter bar should be installed for more protection.

This invention is an improvement on the conventional gas meter connection bar which was developed years ago to insure a rigid connection between the gas meter service pipe and the customer's house pipe and to provide a rigid connection bar to fasten the fragile "tin meter" connections without strain or distortion. Prior to the above development, soft lead pipe was used for "tin meter" connections.

These meter bars are used today to protect "tin meters" as well as "hard case (cast iron and aluminum) meters."

The difficulty in changing meters with the meter bars presently in use (or meters without any meter bars) is that such change requires the operator to:

(1) Ask permission to enter the house and shut off each individual appliance and/or safety pilot light.
(2) Return to "meter set."
(3) Shut off gas service valve.
(4) Remove old gas meter.
(5) Install new gas meter—turn on service valve and purge air from the meter.
(6) Reenter house, purge air from meter and appliance house lines, and light pilots, etc.
(7) Check operation of all burners and safety controls.

This is time consuming, expensive, and often causes poor customer relations, creates hazards and sometimes legal involvement.

It has been estimated from comprehensive surveys that a one-man meter truck can change about ten meters a day with a cost of approximately $2.50 for each meter. A two-man meter change truck "a changer and helper" can change approximately 22 meters a day at an approximate cost of $2.00 each. The time consumed in shutting off appliances, purging air, and relighting and checking safety controls is at least fifteen minutes so that the cost of labor for those extra tasks is approximately .80 'ents in addition to the costs above. All of this additional .ime for these extra tasks can be eliminated by my invention.

OBJECTS

One of the objects of my invention therefore is the provision of an improved meter bar for the elimination of extra work and for the saving of time in changing gas meters.

A further object of my invention is the provision of a meter bar with a built in by-pass which is provided with safety arrangements for the prevention of leakage of gas, for the prevention of the pilfering of gas, and for the prevention of other undesirable consequences.

A further object of my invention is the improvement of the conventional gas meter connection bar which is presently in use.

A further object of my invention is the provision of a new method of changing a gas meter without interrupting service, without requiring special handling and without requiring special fittings to be installed at the time a meter is installed for a new customer or at the time a change of location of the meter set is requested.

A further object is the saving of time in the changing of gas meters.

A further object is the saving of the requirement for expensive equipment in the changing of gas meters.

Further objects and features of the invention will be apparent from the following specification when considered in connection with the following claims and the accompanying drawings.

DETAILED DESCRIPTION

Figure 1:
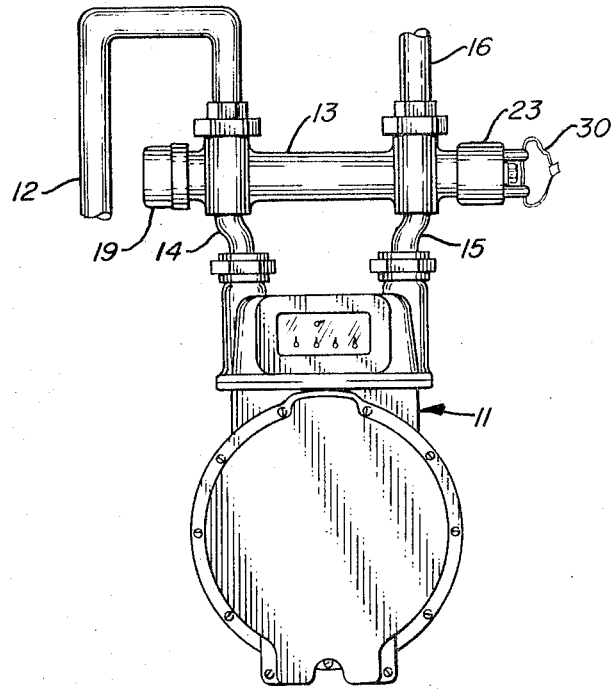
FIG. 1 is a view in elevation of a gas meter installed with my improved meter bar.

Referring now to FIG. 1 of the drawings, it may be seen that I have shown a gas meter 11 connected to a gas supply line 12 by a passage through a meter bar 13 constructed according to my invention, and through a meter inlet pipe 14. After passing through the meter 11, the gas passes through a meter outlet pipe 15 and through the meter bar 13 to the customer's house supply line 16. The meter bar 13 is formed with two inlet ports 17 and 18, one of which is shown covered with a cap 19, and the other of which is connected to the gas supply line pipe 12. In the illustration shown, the inlet 17 is covered by the cap 19 and the inlet 18 is connected to the gas supply line 12, but these connections may be reversed if desired. The meter bar 13 is also provided with a meter port 20 which is connected to the meter inlet pipe 14. Adjacent the opposite end, the meter bar 13 is also provided with a port 21 which is connected to the house supply line 16 and with a port 22 which is connected to the meter outlet pipe 15. At the opposite end of the meter bar 13 from the port 17, and normally closing such end, I provide my cap 23. This is threaded onto the end of the meter bar 13 and is secured as by a recessed pin 24. The escape of gas is prevented by any suitable means, such as, for example, the seals 25 and 26. The seals 25 and 26 are positioned in recesses prepared for them and may preferably be O-rings. Passing through an axial opening in the cap 23 is a cap or jack screw 27, the screw 27 being threaded in operative relationship with the plunger or piston 28 which is positioned in the hollow meter bar 13. The screw 27 is provided with an annular groove in which there is positioned a snap ring 41 to prevent the jack screw 27 from moving outward of the cap 23.

Figure 4:
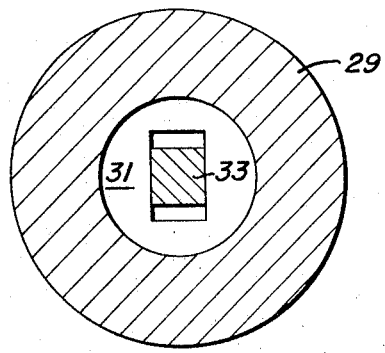
FIG. 4 is a view in vertical section taken substantially on the line 4—4 of FIG. 3.
Figure 5:
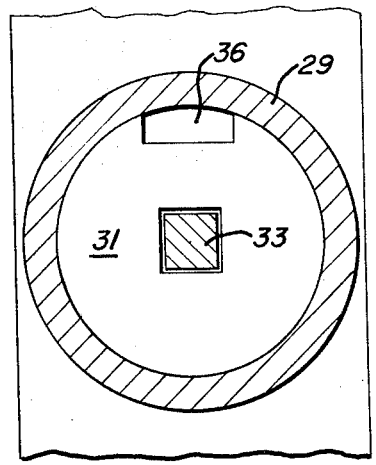
FIG. 5 is a view in vertical section taken substantially on the line 5—5 of FIG. 3.
Figure 6:
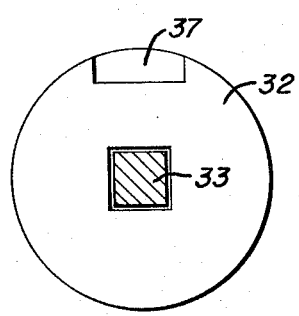
FIG. 6 is a view in vertical section taken substantially on the line 6—6 of FIG. 2.

The valve plunger or piston 28 is a composite piston consisting essentially of a pair of end pieces 31 and 32 and a connecting bar 33. The connecting bar 33 is square in cross section as appears best in FIGS. 4, 5 and 6 and is pinned to the end pieces 31 and 32 respectively by pins such as 34 and 35.

Figure 2:
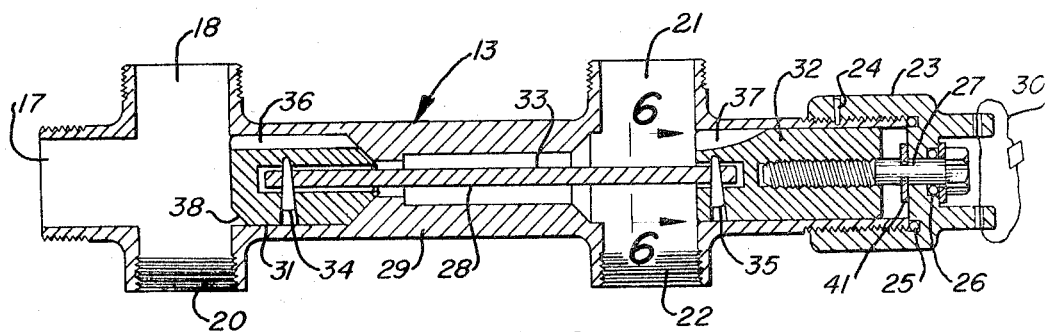
FIG. 2 is a view in vertical section of the meter bar of FIG. 1, showing the valve plunger in the normal position in which it should be placed when gas is flowing from the inlet pipe through the meter bar and through the meter, and then to the customer's house gas line.
Figure 3:
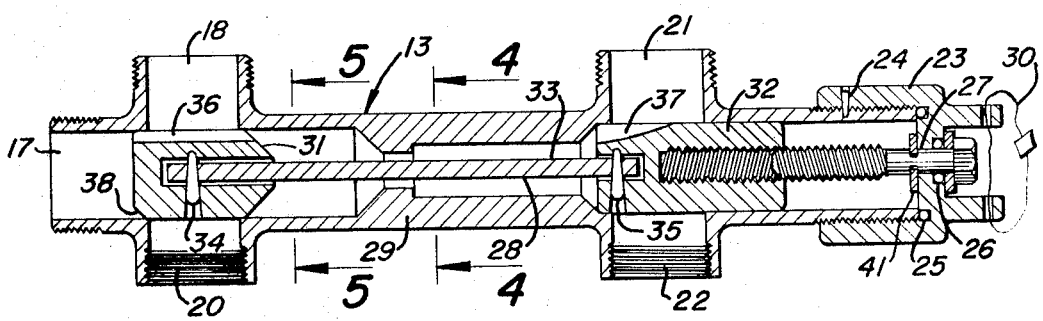
FIG. 3 is a view in vertical section similar to FIG. 2 but showing the valve plunger moved to the position in which the plunger prevents gas from flowing through the meter and bypasses the gas through the meter bar from the inlet pipe or gas line to the customer's gas line.

The meter bar 13 is provided with a body portion 29 which is machined with longitudinal axial stepped bores as shown in FIGS. 2 and 3 for cooperation with plunger 28. The cap 23 is provided with aligned radial bores through which a seal wire 30 is inserted to prevent pilferage or unlawful tampering with the meter or meter bar.

OPERATION

In the operation of changing a gas meter through the use of my improved gas meter connection bar with built-in by-pass without cutting off the customer's gas supply, and without having to shut off pilots, bleed, relight, etc. all of the customer's appliances, a service man proceeds as follows: He breaks the seal wire 30. He turns the jack screw 27 counterclockwise until it stops. This requires about 20 turns. The first turn opens the by-pass through the slot 36 and the last three or four turns shut off the flow of gas through the port 20 and the meter inlet pipe 14 to the meter 11. Nevertheless, gas flowing through the slot 36 may (even though the plunger 28 is moved to the position shown in FIG. 3) pass through the slot 37 to the port 21 and thus to the customer's line 16. The operator then removes the old meter 11 and connects a new meter in place thereof with the inlet connection through meter inlet pipe 14 tight but with the connection at meter outlet pipe 15 unfastened. He then turns the jack screw 27 three or four turns clockwise until a passage is opened past the corner 38 so as to force gas through the meter 11 and thus to purge all air out of the meter 11 and out through the outlet connection which has not yet been fastened to outlet pipe 15.

During all of this time gas has been flowing from supply line 12 through port 18, slot 36, the longitudinal bores and passage 37 and port 21 to house supply pipe 16, and the plunger 28 seals all outside passages so that no air may pass into the house supply line 16, the end piece 32 keeping the port 22 tightly sealed. Thereupon the loose outlet connection is tightened to pipe 15 and then the jack screw 27 is turned clockwise to the stop position (i.e. the position of FIG. 2) and a new seal wire is installed.

It is to be understood that the above described embodiment of my invention is for the purpose of illustration only, and various changes may be made therein without departing from the spirit and scope of the invention.

I claim:

1. In a meter bar formed with a pair of spaced inlet connections; formed with a pair of spaced gas meter connections; formed with an outlet connection; formed with a longitudinal hollow therethrough; and provided with a valve member with spaced solid portions, said valve member being positioned in said hollow for movement between a fully closed position and a fully, normally open position; wherein, in said fully open position, the path of gas flow is limited to a normal path from one of said inlet connections through said meter from one of said gas meter connections to the other, and thence out said outlet connection, said normal path making two transverse intersections with said hollow; the improvement which comprises, as said valve member, a plunger which is movable along a longitudinal linear path; which plunger is formed with a passageway longitudinal of the hollow in the meter bar, said passageway leading from a portion of said plunger proximate to one of said inlet connections to a portion of said plunger proximate to said outlet connection; and wherein, in said fully closed position, said solid portions occupy said intersections, said normal path of gas flow is completely blocked at both said gas meter connections by said respective solid portions and gas flow is limited to a path through said longitudinal passageway and through the longitudinal hollow of said bar; wherein said plunger is sufficiently shorter in length than said hollow to provide, in said fully open position, for the substantial removal of said solid portions from the occupation of said intersections.

2. The structure of claim 1 in which the plunger comprises a connecting rod which joins said spaced solid portions together and which comprises a jack screw threaded into one of said solid portions for moving said plunger longitudinally of the hollow of said meter bar.

3. The structure of claim 2 in which one of said solid portions is formed with a longitudinal slot extending substantially the full length thereof.

4. The structure of claim 2 in which one of said solid portions is formed with a slot only at one end thereof.

5. In combination:
    a gas supply pipe;
    a customer's gas line;
    a gas meter;
    a meter bar having a longitudinal hollow and a plurality of ports including one port adjacent to one end connected to said gas supply pipe and another port adjacent to the opposite end connected to said customer's gas line;
    a meter inlet pipe connected to another port of said meter bar which is adjacent to the end of the bar having the port which is connected to the gas supply pipe;
    a meter outlet pipe connected to another port of said meter bar which is adjacent to the end of the bar having the port which is connected to the customer's gas line;
    means comprising a longitudinally movable plunger in said longitudinal hollow for normally preventing the flow of gas from the ports adjacent one end of said bar to the ports adjacent to the opposite end of said bar while allowing the flow of gas from the port connected to the gas supply pipe of the port connected to the meter inlet pipe and from the port connected to the meter outlet pipe to the port connected to the customer's gas line, said plunger being formed with a longitudinal means to allow flow through the longitudinal hollow of the bar; and
    means for moving said plunger longitudinally to a position in which a flow of gas is provided longitudinally of said bar from the port connected to the gas supply line to the port connected to the customer's gas line and in which the ports of the meter bar connected to the meter inlet pipe and the meter outlet pipe are both blocked whereby at such time, gas may flow longitudinally directly from the gas supply pipe port, through said hollow to the customer's gas line port.

6. The combination of claim 5 in which the plunger comprises a connecting rod and a pair of end pieces having a greater diameter than the rod and substantially filling the longitudinal hollow each secured to one end of said connecting rod.

7. The combination of claim 5 in which the plunger has a relatively small intermediate portion and has end portions substantially filling the longitudinal hollow of the bar.

8. The combination of claim 7 in which the means for moving the plunger is a jack screw threaded into one end of the plunger.

9. In combination:
   a gas supply pipe;
   a customer's gas line;
   gas meter;
   a meter bar having
     a longitudinal hollow provided with a conical seat having a forward end and a rear end, having a plurality of passages, and having a plurality of ports including one port adjacent to the rear end connected to said gas supply pipe and another port adjacent to the forward end connected to said customer's gas line;
   a meter inlet pipe connected to another port of said meter bar which is adjacent to the end of the bar having the port which is connected to the gas supply pipe;
   a meter outlet pipe connected to another port of said meter bar which is adjacent to the end of the bar having the port which is connected to the customer's gas line;
   means comprising a plunger positioned for longitudinal movement in said longitudinal hollow for normally preventing the flow of gas from the ports adjacent one end of said bar to the ports adjacent to the opposite end of said bar while allowing the flow of gas from the port connected to the gas suppy pipe to the port connected to the meter inlet pipe and from the port connected to the meter outlet pipe to the port connected to the customer's gas line, said plunger comprising a square section connecting rod of relatively small cross section dimensions, said plunger comprising a rear end piece of relatively large diameter and substantially filling said longitudinal hollow, having a conical end normally fitting in and sealing with said conical seat, having a longitudinal groove extending from end to end on one surface thereof, and being pinned to the rear of said rod, and said plunger comprising a forward end piece of relatively large diameter and substantially filling said longitudinal hollow, having a groove on one surface thereof extending only partially from one end to the other, and formed with an axial threaded bore at its outside end; and
   means for moving said plunger longitudinally within said hollow to a position in which a flow of gas is provided longitudinally of said bar from the port connected to the gas supply line to the port connected to the customer's gas line and in which the ports of the meter bar connected to the meter inlet pipe and the meter outlet pipe are both blocked, said means comprising a cap secured to the end of said bar adjacent the ports connected to the customer's gas line and the meter outlet pipe; and a jack screw extending through said cap and threaded into said threaded bore.

References Cited by the Examiner

UNITED STATES PATENTS 2,579,656  12/1951  Douglas et al. _____ 73—201
2,748,600   6/1956  Allen _____ 73—201

FOREIGN PATENTS 1,190,789   4/1959  France.

RICHARD C. QUEISSER, *Primary Examiner.*

EDWARD D. GILHOOLY, *Assistant Examiner.*